United States Patent
Phillips et al.

(10) Patent No.: US 7,871,352 B2
(45) Date of Patent: Jan. 18, 2011

(54) EIGHT SPEED AUTOMATIC TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US);
Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 483 days.

(21) Appl. No.: 12/049,004

(22) Filed: Mar. 14, 2008

(65) Prior Publication Data

US 2008/0242492 A1 Oct. 2, 2008

Related U.S. Application Data

(60) Provisional application No. 60/909,576, filed on Apr. 2, 2007.

(51) Int. Cl.
*F16H 3/44* (2006.01)

(52) U.S. Cl. .................. 475/286; 475/269; 475/330

(58) Field of Classification Search ........... 475/269, 475/275–279, 284, 286, 288, 296, 317, 323, 475/330, 337
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,285,069 B2 * | 10/2007 | Klemen | 475/275 |
| 7,311,635 B2 * | 12/2007 | Klemen | 475/286 |
| 7,621,840 B2 * | 11/2009 | Kamm et al. | 475/275 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0015081 A1 * | 1/2008 | Kamm et al. | 475/276 |
| 2008/0261769 A1 * | 10/2008 | Phillips et al. | 475/288 |
| 2010/0048344 A1 * | 2/2010 | Kamm et al. | 475/275 |

* cited by examiner

*Primary Examiner*—David D Le
*Assistant Examiner*—Justin Holmes

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

30 Claims, 5 Drawing Sheets

| GEAR STATE | GEAR RATIO | RATIO STEP | TORQUE TRANSMITTING DEVICES | | | | |
|---|---|---|---|---|---|---|---|
| | | | 36 | 38 | 26 | 28 | 32 |
| REV | -3.631 | | X | X | | X | |
| N | | -0.75 | | | | | |
| 1ST | 4.860 | | X | X | | | X |
| 2ND | 3.510 | 1.38 | X | X | X | | |
| 3RD | 2.700 | 1.30 | | X | X | | X |
| 4TH | 2.111 | 1.28 | | X | X | X | |
| 5TH | 1.515 | 1.39 | | X | | X | X |
| 6TH | 1.000 | 1.52 | | | X | X | X |
| 7TH | 0.838 | 1.19 | X | | | X | X |
| 8TH | 0.697 | 1.20 | X | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 136 | 138 | 126 | 128 | 132 |
| REV | -2.284 | | X | X | | | X |
| N | | -0.48 | O | O | | | |
| 1ST | 4.752 | | X | X | | X | |
| 2ND | 3.041 | 1.56 | X | X | X | | |
| 3RD | 2.560 | 1.19 | | X | X | X | |
| 4TH | 2.157 | 1.19 | | X | X | | X |
| 5TH | 1.406 | 1.53 | | X | | X | X |
| 6TH | 1.000 | 1.41 | | | X | X | X |
| 7TH | 0.860 | 1.16 | X | | | X | X |
| 8TH | 0.688 | 1.25 | X | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 236 | 238 | 226 | 228 | 232 |
| REV | -1.629 | | X | X | | | X |
| N | | -0.35 | O | O | | | |
| 1ST | 4.595 | | X | X | X | | |
| 2ND | 2.688 | 1.71 | X | X | | X | |
| 3RD | 1.633 | 1.47 | | X | X | X | |
| 4TH | 1.500 | 1.22 | | X | | X | |
| 5TH | 1.165 | 1.29 | | X | X | | X |
| 6TH | 1.000 | 1.17 | | | X | X | X |
| 7TH | 0.870 | 1.15 | X | | X | | X |
| 8TH | 0.677 | 1.28 | X | | | X | X |

X = ON - ENGAGED CARRYING TORQUE
O = ON - ENGAGED NOT CARRYING TORQUE

FIG. 9

EIGHT SPEED AUTOMATIC TRANSMISSION

CROSS-REFERENCE TO RELATED APPLICATIONS

This application claims the benefit of U.S. Provisional Application No. 60/909,576 filed on Apr. 2, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting clutches and brakes.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

One embodiment of the transmission of the present invention includes an input member, an output member, and first, second, third and fourth planetary gear sets each having a sun gear, a carrier member, and a ring gear, wherein the input member is continuously interconnected with the sun gear of the first planetary gear set and the carrier member of the second planetary gear set and the output member is continuously interconnected with the carrier member of the fourth planetary gear set. A first interconnecting member continuously interconnects the ring gear of the first planetary gear set with the carrier member of the third planetary gear set. A second interconnecting member continuously interconnects the sun gear of the second planetary gear set with the sun gear of the third planetary gear set. A third interconnecting member continuously interconnects the ring gear of the third planetary gear set with the sun gear of the fourth planetary gear set. A first torque transmitting device is selectively engageable to interconnect at least one of the sun gear of the second planetary gear set and the sun gear of the third planetary gear set with the carrier member of the first planetary gear set. A second torque transmitting device is selectively engageable to interconnect the ring gear of the second planetary gear set with at least one of the carrier member of the fourth planetary gear set and the output member. A third torque transmitting device is selectively engageable to interconnect at least one of the sun gear of the third planetary gear set and the sun gear of the second planetary gear set with at least one of the ring gear of the third planetary gear set and the sun gear of the fourth planetary gear set. A fourth torque transmitting device is selectively engageable to interconnect the carrier member of the first planetary gear with a stationary member. A fifth torque transmitting device is selectively engageable to interconnect the ring gear of the fourth planetary gear set with the stationary member. The torque transmitting devices are selectively engageable in combinations of at least three to establish at least eight forward speed ratios and at least one reverse speed ratio between the input member and the output member.

Another embodiment of the transmission of the present invention includes an input member, an output member, and first, second, third and fourth planetary gear sets each having a sun gear, a carrier member, and a ring gear, wherein the input member is continuously interconnected with the carrier member of the first planetary gear set and the ring gear of the second planetary gear set and the output member is continuously interconnected with the carrier member of the fourth planetary gear set. A first interconnecting member continuously interconnects the sun gear of the first planetary gear set with the carrier member of the third planetary gear set. A second interconnecting member continuously interconnects the sun gear of the second planetary gear set with the sun gear of the third planetary gear set. A third interconnecting member continuously interconnects the ring gear of the third planetary gear set with the sun gear of the fourth planetary gear set. A first torque transmitting device is selectively engageable to interconnect the ring gear of the first planetary gear set with the carrier member of the second planetary gear set. A second torque transmitting device is selectively engageable to interconnect at least one of the sun gear of the second planetary gear set and the sun gear of the third planetary gear set with the ring gear of the first planetary gear set. A third torque transmitting device is selectively engageable to interconnect at least one of the carrier member of the fourth planetary gear set and the output member with the carrier member of the second planetary gear set. A fourth torque transmitting device is selectively engageable to interconnect at least one of the sun gear of the first planetary gear set and the carrier member of the third planetary gear set with a stationary member. A fifth torque transmitting device is selectively engageable to interconnect the ring gear of the fourth planetary gear set with the stationary member. The torque transmitting devices are selectively engageable in combinations of at least three to establish at least eight forward speed ratios and at least one reverse speed ratio between the input member and the output member.

Yet another embodiment of the transmission of the present invention includes an input member, an output member, and first, second, third and fourth planetary gear sets each having a sun gear, a carrier member, and a ring gear, wherein the input member is continuously interconnected with the ring gear of the first planetary gear set and the carrier member of the second planetary gear set and the output member is continuously interconnected with the ring gear of the fourth planetary gear set. A first interconnecting member continuously interconnects the sun gear of the first planetary gear set with the sun gear of the third planetary gear set. A second interconnecting member continuously interconnects the sun gear of the second planetary gear set with the ring gear of the third planetary gear set. A third interconnecting member continuously interconnects the carrier member of the third planetary gear set with the carrier member of the fourth planetary gear set. A first torque transmitting device is selectively engageable to interconnect the ring gear of the second planetary gear set with at least one of the sun gear of the third planetary gear set and the sun gear of the first planetary gear set. A second torque transmitting device is selectively engageable to interconnect the ring gear of the second planetary gear set with the carrier member of the first planetary gear set. A third torque transmitting device is selectively engageable to interconnect at least one of the ring gear of the fourth planetary gear set and the output member with the carrier member of the first planetary gear set. A fourth torque transmitting device is selectively engageable to interconnect at least one of the sun gear of the second planetary gear set and the ring gear of the third planetary gear set with a stationary member. A fifth torque transmitting device is selectively engageable to interconnect the sun gear of the fourth planetary gear set with the stationary member. The torque transmitting devices are selectively engageable in combinations of at least three to establish at least eight forward speed ratios and at least one reverse speed ratio between the input member and the output member.

Further objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 9 is a truth table presenting the state of engagement of the various torque transmitting clutches and brakes in each of the available forward and reverse speeds or gear ratios of the automatic transmission illustrated in FIGS. 7 and 8.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These permanent mechanical connections relate the transmission embodiments. More specifically, a first component or element of a first planetary gear set is permanently coupled to a first component or element of a second planetary gear set. A third component or element of the first planetary gear set is permanently coupled to a third component or element of a third planetary gear set. A second component or element of the second planetary gear set is permanently coupled to a second component or element of the third planetary gear set. Finally, a first component or element of the third planetary gear set is permanently coupled to a first component or element of a fourth planetary gear set.

Figure 1:
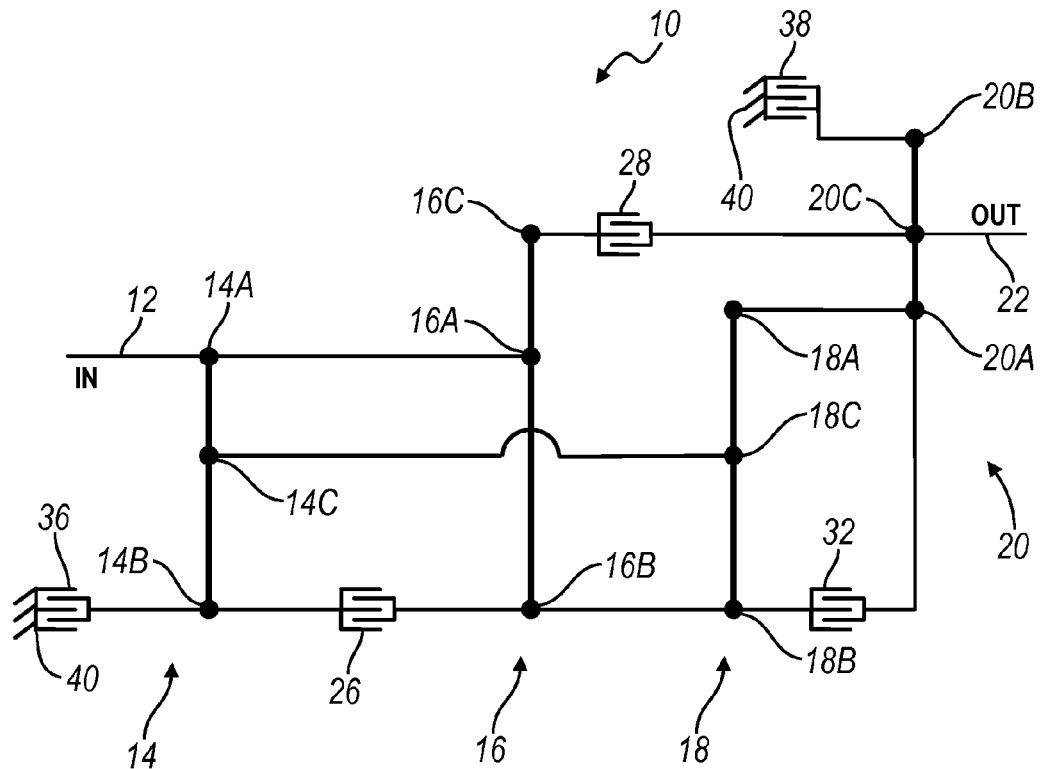
FIG. 1 is a lever diagram of a first embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set. wherein the three basic mechanical components of said planetary gear set are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gear set. These lever ratios, in turn, are used to vary the gear ratios of the transmission in order to achieve appropriate ratios and an appropriate ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22. The first node 14A of the first planetary gear set 14 is coupled to the first node 16A of the second planetary gear set 16. The third node 14C of the first planetary gear set 14 is coupled to the third node 18C of the third planetary gear set 18. The second node 16B of the second planetary gear set 16 is coupled to the second node 18B of the third planetary gear set 18. The first node 18A of the third planetary gear set 18 is coupled to the first node 20A of the fourth planetary gear set 20.

The input shaft or member 12 is coupled to the first node 14A of the first planetary gear set 14. The output shaft or member 22 is coupled to the third node 20C of the fourth planetary gear set 20. A first clutch 26 selectively connects the second node 14B of the first planetary gear set 14 to the second node 16B of the second planetary gear set 16. A second clutch 28 selectively connects the third node 16C of the second planetary gear set 16 to the third node 20C of the fourth planetary gear set 20 and the output shaft or member 22. A third clutch 32 selectively connects the second node 18B of the third planetary gear set 18 to the first node 20A of the fourth planetary gear set 20. A first brake 36 selectively connects the second node 14B of the first planetary gear set 14 to ground, stationary member, or transmission housing 40. A second brake 38 selectively connects the second node 20B of the fourth planetary gear set 20 to ground, stationary member, or transmission housing 40.

Figure 2:
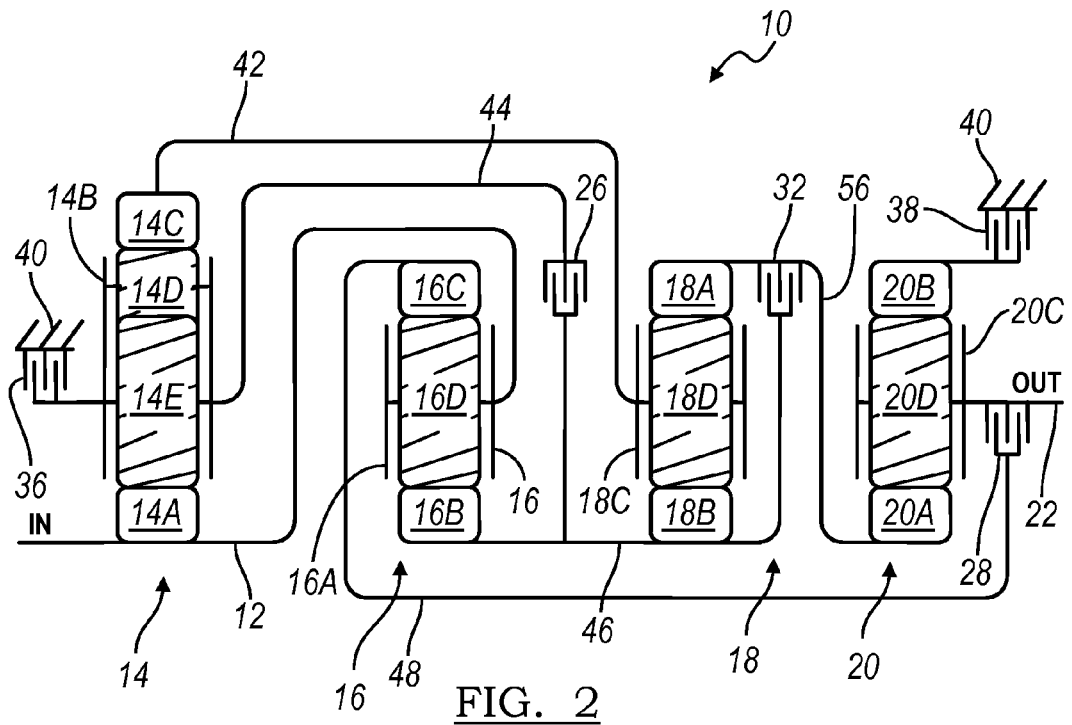
FIG. 2 is a diagrammatic view of the first embodiment of an eight speed automatic transmission according to the present invention.

Referring now to FIG. 2, a stick diagram presents a schematic layout of the first embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets 14, 16, 18 and 20 now appear as components of planetary gear sets such a sun gear members, ring gear members and planet gear carrier members having planet gears.

For example, the transmission 10 includes the input shaft or member 12 which is coupled to and directly drives a first sun gear member 14A of the first planetary gear set 14. An extension of the input shaft or member 12 is connected to a second planet carrier member 16A of the second planetary gear set 16. The second planet carrier member 16A includes a plurality of planet gears 16D rotatably disposed thereon. The planet gears 16D are each configured to intermesh with both the sun gear member 16B and the ring gear member 16C. The output shaft or member 22 is coupled to and directly driven by a fourth planet carrier member 20C of the fourth planetary gear set 20. The fourth planet carrier member 20C includes a plurality of planet gears 20D rotatably disposed thereon. The planet gears 20D are each configured to intermesh with both the sun gear member 20A and the ring gear member 20B.

A first clutch 26 selectively interconnects a first planet carrier member 14B of the first planetary gear set 14 with a second sun gear member 16B of the second planetary gear set 16 and a third sun gear member 18B of the third planetary gear set 18. The first planet carrier member 14B includes a plurality of pairs of planet gears 14D, 14E rotatably disposed thereon. The planet gears 14E are configured to each intermesh with both the sun gear member 14A and the planet gears 14D. The planet gears 14D are configured to each intermesh with both the planet gears 14E and the ring gear member 14C. A second clutch 28 selectively connects a second ring gear member 16C of the second planetary gear set 16 to the fourth planet carrier member 20C of the fourth planetary gear set 20 and the output shaft or member 22. A third clutch 32 selectively interconnects the second sun gear member 16B of the second planetary gear set 16 and the third sun gear member 18B of the third planetary gear set 18 with a third ring gear member 18A of the third planetary gear set 18 and a fourth sun gear member 20A of the fourth planetary gear set 20. A first brake 36 connects the first planet carrier member 14B of the first planetary gear set 14 to ground, stationary member, or transmission housing 40. A second brake 38 connects a fourth ring gear member 20B of the fourth planetary gear set 20 to ground, stationary member, or transmission housing 40.

A first shaft, quill or interconnecting member 42 couples a first ring gear member 14C of the first planetary gear set 14 to a third planet carrier member 18C of the third planetary gear set 18. The third planet carrier member 18C includes a plurality of planet gears 18D rotatably disposed thereon. The planet gears 18D are each configured to intermesh with both the sun gear member 18B and the ring gear member 18A. A second shaft, quill or interconnecting member 44 couples the first planet carrier member 14B of the first planetary gear set 14 to the first clutch 26. A third shaft, quill or interconnecting member 46 couples the first clutch 26 to the second sun gear member 16B of the second planetary gear set 16, the third sun gear member 18B of the third planetary gear set 18 and the third clutch 32. A fourth shaft, quill or interconnecting member 48 couples the second ring gear member 16C of the second planetary gear set 16 to the second clutch 28. A fifth shaft, quill or interconnecting member 56 couples the third ring gear member 18A of the third planetary gear set 18, the third clutch 32 and the fourth sun gear member 20A of the fourth planetary gear set 20.

Figures 3, 4:
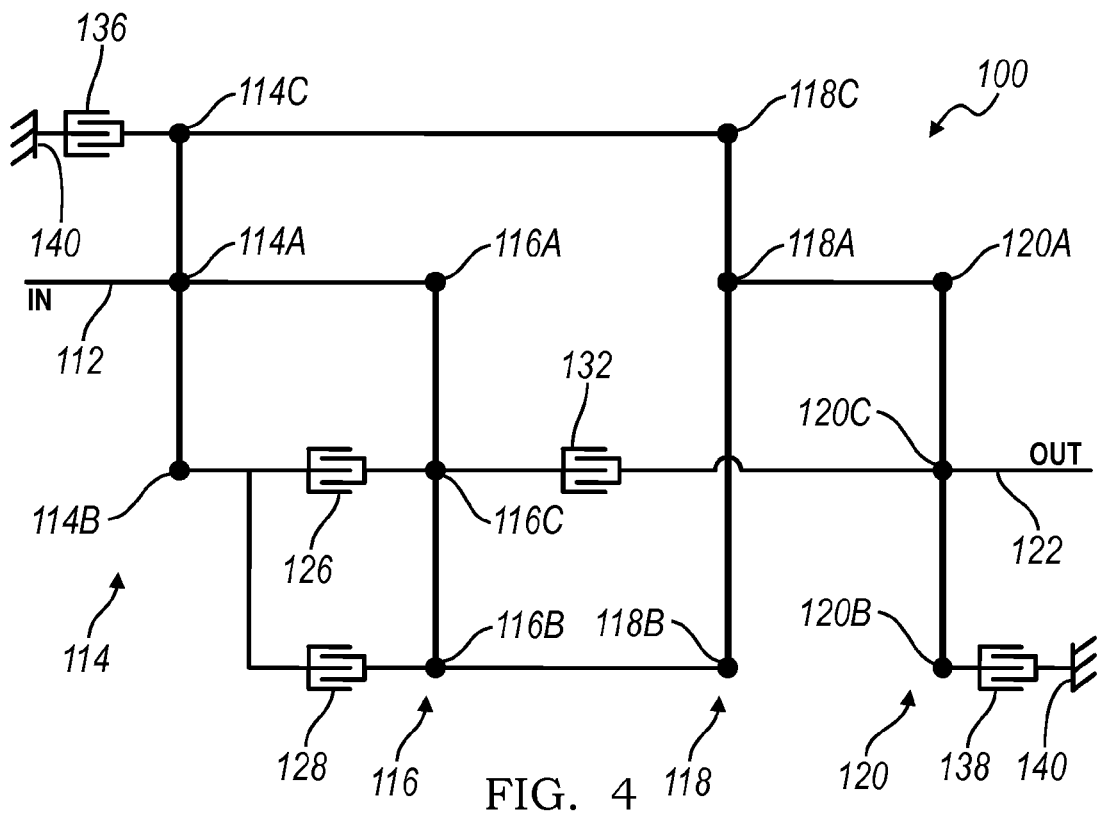
FIG. 3 is a truth table presenting the state of engagement of the various torque transmitting clutches and brakes in each of the available forward and reverse speeds or gear ratios of the automatic transmission illustrated in FIGS. 1 and 2.
FIG. 4 is a lever diagram of a second embodiment of an eight speed automatic transmission according to the present.

Referring now to FIGS. 2 and 3, the operation of the first embodiment of the eight speed automatic transmission 10 will be described. It will be appreciated that the automatic transmission 10 is capable of transmitting torque from the input shaft or member 12 to the output shaft or member 22 in eight forward speed or torque ratios and one reverse speed or torque ratio. Each forward and reverse speed or torque ratio is attained by engagement of a combination of three of the clutches and brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish forward and reverse speed ratios, three torque transmitting devices are engaged for each gear state. The engaged clutches and brakes are represented by an "X" in each respective row. For example, to establish reverse gear, the first brake 36, the second brake 38 and the second clutch 28 are engaged or activated. The first brake 36 grounds the first planet carrier member 14B of the first planetary gear set 14. The second brake 38 grounds the fourth ring gear member 20B of the fourth planetary gear set 20. The second clutch 28 interconnects the second ring gear member 16C of the second planetary gear set 16 through the fourth shaft, quill or interconnecting member 48 with the fourth planet carrier member 20C of the fourth planetary gear set 20 and the output shaft or member 22.

Likewise, the eight forward ratios are achieved through different combinations of clutch and brake engagement as shown in FIG. 3.

It will be appreciated that the operation and gear states of the first embodiment of the eight speed automatic transmission 10 assume, first of all, that the brakes and clutches not specifically referenced in a given gear state are inactive or disengaged and, second of all, that during gear member shifts, i.e., changes of gear state, between at least adjacent gear states, a clutch or brake engaged or activated in both gear states will remain engaged or activated.

Turning now to FIG. 4, a lever diagram for a second embodiment of an eight speed automatic transmission 100 is illustrated. The automatic transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122. The first node 114A of the first planetary gear set 114 is coupled to the first node 116A of the second planetary gear set 116. The third node 114C of the first planetary gear set 114 is coupled to the third node 118C of the third planetary gear set 118. The second node 116B of the second planetary gear set 116 is coupled to the second node 118B of the third planetary gear set 118. The first node 118A of the third planetary gear set 118 is coupled to the first node 120A of the fourth planetary gear set 120.

The input shaft or member 112 is coupled to the first node 114A of the first planetary gear set 114. The output shaft or member 122 is coupled to the third node 120C of the fourth planetary gear set 120. A first clutch 126 selectively connects the second node 114B of the first planetary gear set 114 to the third node 116C of the second planetary gear set 116. A second clutch 128 selectively connects the second node 114B of the first planetary gear set 114 to the second node 116B of the second planetary gear set 116. A third clutch 132 selectively connects the third node 116C of the second planetary gear set 116 to the third node 120C of the fourth planetary gear set 120. A first brake 136 selectively connects the third node 114C of the first planetary gear set 114 to ground, stationary member, or transmission housing 140. A second brake 138 selectively connects the second node 120B of the fourth planetary gear set 120 to ground, stationary member, or transmission housing 140.

Figures 5, 6:
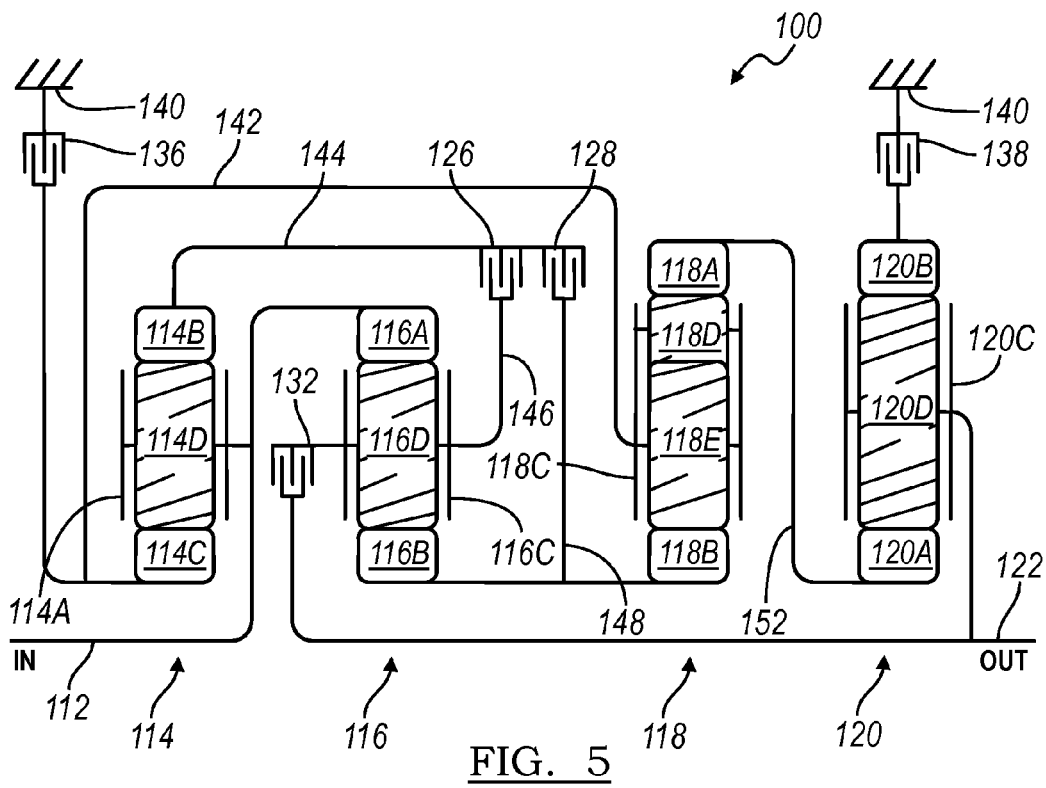
FIG. 5 is a diagrammatic view of the second embodiment of an eight speed automatic transmission according to the present invention.
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIG. 5, a stick diagram presents a schematic layout of the second embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets 114, 116, 118 and 120 now appear as components of planetary gear sets such a sun gear members, ring gear members and planet carrier members having planet gears.

The transmission 100 includes the input shaft or member 112 which is coupled to and directly drives a first planet carrier member 114A of the first planetary gear set 114 and a second ring 116A of the second planetary gear set 116. The first planet carrier member 114A includes a plurality of planet gears 114D which are rotatably disposed thereon. The planet gears 114D are each configured to intermesh with both the sun gear member 114C and the ring gear member 114B. The first clutch 126 selectively connects a first ring gear member 114B of the first planetary gear set 114 to a second planet carrier member 116C of the second planetary gear set 116. The second planet carrier member 116C includes a plurality of planet gears 116D which are rotatably disposed thereon. The planet gears 116D are each configured to intermesh with both the sun gear member 116B and the ring gear member 116A. The second clutch 128 selectively interconnects the first ring gear member 114B of the first planetary gear set 114 with a second sun gear member 116B of the second planetary gear set 116 and a third sun gear member 118B of the third planetary gear set 118. The third clutch 132 selectively interconnects the second planet carrier member 116C of the second planetary gear set 116 with a fourth planet carrier member 120C of the fourth planetary gear set 120 and the output shaft or member 122. The fourth planet carrier member 120C includes a plurality of planet gears 120D which are rotatably disposed thereon. The planet gears 120D are configured to each intermesh with both the sun gear member 120A and the ring gear member 120B. A first brake 136 selectively interconnects a first sun gear member 114C of the first planetary gear set 114 and a third planet carrier member 118C of the third planetary gear set 118 to ground, stationary member, or transmission housing 140. The third planet carrier member 118C includes a plurality of pairs of planet gears 118D, 118E which are rotatably disposed thereon. The planet gears 118D are configured to each intermesh with both the planet gears 118E and the ring gear member 118A. The planet gears 118E are configured to each intermesh with both the planet gears 118D and the sun gear member 118B. A second brake 138 selectively connects a fourth ring gear member 120B of the fourth planetary gear set 120 to ground, stationary member, or transmission housing 140.

A first shaft, quill or interconnecting member 142 couples the first sun gear member 114C of the first planetary gear set 114 and the first brake 136 to the third planet carrier member 118C of the third planetary gear set 118. A second shaft, quill or interconnecting member 144 couples the first ring gear member 114B of the first planetary gear set 114 to the first clutch 126 and the second clutch 128. A third shaft, quill or interconnecting member 146 couples the first clutch 126 to the second planet carrier member 116C of the second planetary gear set 116. A fourth shaft, quill or interconnecting member 148 couples the second sun gear member 116B of the second planetary gear set 116 and the third sun gear member 118B of the third planetary gear set 118 to the second clutch 128. A fifth shaft, quill or interconnecting member 152 couples a third ring gear member 118A of the third planetary gear set 118 to a fourth sun gear member 120A of the fourth planetary gear set 120.

Referring now to FIGS. 5 and 6, the operation of the second embodiment of the eight speed automatic transmission 100 will be described. It will be appreciated that the automatic transmission 100 is capable of transmitting torque from the input shaft or member 112 to the output shaft or member 122 in eight forward speed or torque ratios and one reverse speed or torque ratio. Each forward and reverse speed or torque ratio is attained by engagement of a combination of three of the clutches and brakes as will be explained below. FIG. 6 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish forward and reverse speed ratios, three torque transmitting devices are engaged for each gear state. The engaged clutches and brakes are represented by an "X" in each respective row. For example, to establish reverse gear, the first brake 136, the second brake 138 and the third clutch 132 are activated or engaged. The first brake 136 grounds the first sun gear member 114C of the first planetary gear set 114 and the third planet carrier member 118C of the third planetary gear set 118. The second brake 138 grounds the fourth ring gear member 120B of the fourth planetary gear set 120. The third clutch 132 interconnects the second planet carrier member 116C of the second planetary gear set 116 to the fourth planet carrier member 120C of the fourth planetary gear set 120 and the output shaft or member 122. Similarly, the eight forward ratios are achieved through different combinations of clutch and brake engagement as shown in FIG. 6.

It will be appreciated that the operation and gear states of the eight speed automatic transmission 100 assume, first of all, that the brakes and clutches not specifically referenced in a given gear state are inactive or disengaged and, second of all, that during gear member shifts, i.e., changes of gear state, between at least adjacent gear states, a clutch or brake engaged or activated in both gear states will remain engaged or activated.

Figure 7:
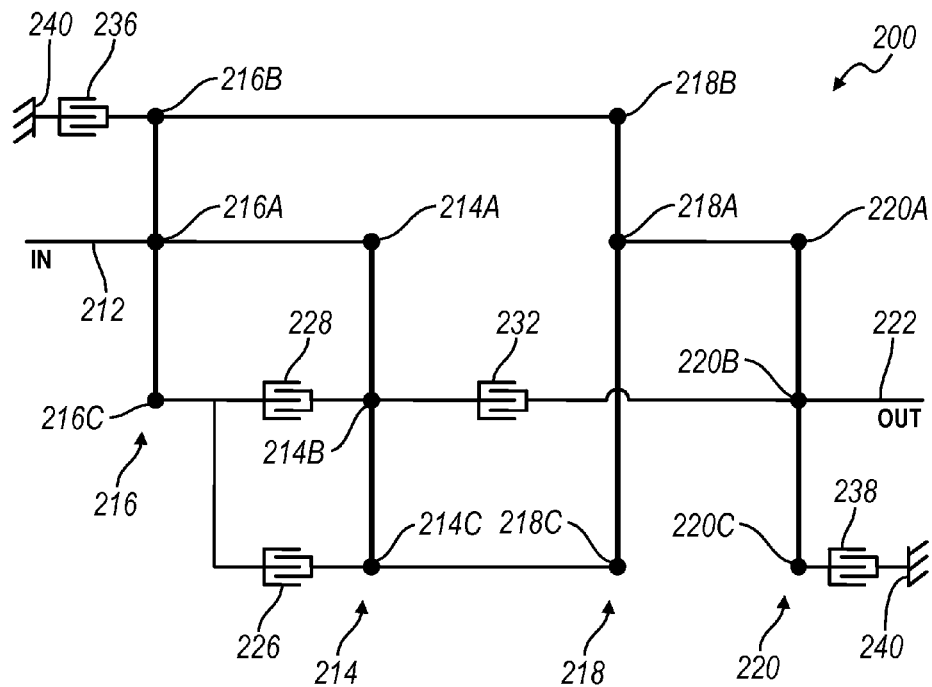
FIG. 7 is a lever diagram of a third embodiment of an eight speed automatic transmission according to the present.

Turning now to FIG. 7, a lever diagram for a third embodiment of an eight speed automatic transmission 200 is illustrated. The automatic transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222. The first node 214A of the first planetary gear set 214 is coupled to the first node 216A of the second planetary gear set 216. The third node 214C of the first planetary gear set 214 is coupled to the third node 218C of the third planetary gear set 218. The second node 216B of the second planetary gear set 216 is coupled to the second node 218B of the third planetary gear set 218. The first node 218A of the third planetary gear set 218 is coupled to the first node 220A of the fourth planetary gear set 220.

The input shaft or member 212 is coupled to the first node 216A of the second planetary gear set 216 and the first node 214A of the first planetary gear set 214. The output shaft or member 222 is coupled to the second node 220B of the fourth planetary gear set 220. A first clutch 226 selectively connects the third node 214C of the first planetary gear set 214 to the third node 216C of the second planetary gear set 216. A second clutch 228 selectively connects the second node 214B of the first planetary gear set 214 to the third node 216C of the second planetary gear set 216. A third clutch 232 selectively connects the second node 214B of the first planetary gear set 214 to the second node 220B of the fourth planetary gear set 220 and the output shaft or member 222. A first brake 236 selectively connects the second node 216B of the second planetary gear set 216 to ground, stationary member, or transmission housing 240. A second brake 238 selectively connects the third node 220C of the fourth planetary gear set 220 to ground, stationary member, or transmission housing 240.

Figure 8:
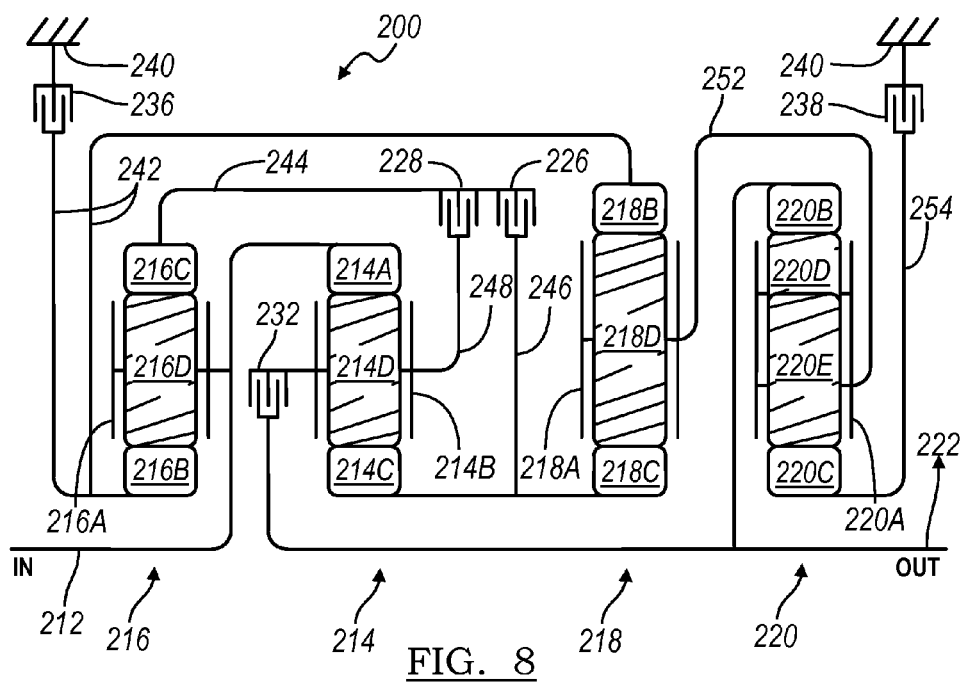
FIG. 8 is a diagrammatic view of the third embodiment of an eight speed automatic transmission according to the present invention.

Referring now to FIG. 8, a stick diagram presents a schematic layout of the third embodiment of the eight speed transmission 200 according to the present invention. In FIG. 8, the numbering from the lever diagram of FIG. 7 is carried over. The clutches, brakes and couplings are correspondingly presented whereas the nodes of the planetary gear sets now appear as components of planetary gear sets such a sun gear members, ring gear members and planet carrier members having planet gears.

The transmission 200 includes the input shaft or member 212 which is coupled to and directly drives a second planet carrier member 216A of the second planetary gear set 216 and a first ring gear member 214A of the first planetary gear set 214. The second planet carrier member 216A includes a plurality of planet gears 216D which are rotatably disposed thereon. The planet gears 216D are configured to each intermesh with both the sun gear member 216B and the ring gear member 216C. The output shaft or member 222 is coupled to and directly driven by a fourth ring gear member 220B of the fourth planetary gear set 220. The first clutch 226 selectively interconnects a second ring gear member 216C of the second planetary gear set 216 with a first sun gear member 214C of the first planetary gear set 214 and a third sun gear member 218C of the third planetary gear set 218. The second clutch 228 selectively connects the second ring gear member 216C of the second planetary gear set 216 to a first planet carrier member 214B of the first planetary gear set 214. The first planet carrier member 214B includes a plurality of planet gears 214D rotatably disposed thereon. The planet gears 214D are configured to each intermesh with both the sun gear member 214C and the ring gear member 214A. The third clutch 232 selectively interconnects the first planet carrier member 214B of the first planetary gear set 214 with the fourth ring gear member 220B of the fourth planetary gear set 220 and the output shaft or member 222. The first brake 236 interconnects a second sun gear member 216B of the second planetary gear set 216 and a third ring gear member 218B of the third planetary gear set 218 to ground, stationary member, or transmission housing 240. The second brake 238 connects a fourth sun gear member 220C of the fourth planetary gear set 220 to ground, stationary member, or transmission housing 240.

A first shaft, quill or interconnecting member 242 couples the second sun gear member 216B of the second planetary gear set 216 and the third ring gear member 218B of the third planetary gear set 218 to the first brake 236. A second shaft, quill or interconnecting member 244 couples the second ring gear member 216C of the second planetary gear set 216 to the second clutch 228 and the first clutch 226. A third shaft, quill or interconnecting member 246 couples the first sun gear member 214C of the first planetary gear set 214 and the third sun gear member 218C of the third planetary gear set 218 to the first clutch 226. A fourth shaft, quill or interconnecting member 248 couples the first planet carrier member 214B of the first planetary gear set 214 to the second clutch 228. A fifth shaft, quill or interconnecting member 252 couples a third planet carrier member 218A of the third planetary gear set 218 to a fourth planet carrier member 220A of the fourth planetary gear set 220. The third planet carrier member 218A includes a plurality of planet gears 218D rotatably disposed thereon. The planet gears 218D are configured to each intermesh with both the sun gear member 218C and the ring gear member 218B. The fourth planet carrier member 220A includes a plurality of pairs of planet gears 220D, 220E rotatably disposed thereon. The planet gears 220D are configured to each intermesh with both the planet gears 220E and the ring gear member 220B. The planet gears 220E are configured to each intermesh with both the planet gears 220D and the sun gear member 220C. A sixth shaft, quill or interconnecting member 254 couples the fourth sun gear member 220C of the fourth planetary gear set 220 to the second brake 238.

Referring now to FIGS. 8 and 9, the operation of the third embodiment of the eight speed automatic transmission 200 will be described. It will be appreciated that the automatic transmission 200 is capable of transmitting torque from the input shaft or member 212 to the output shaft or member 222 in eight forward speed or torque ratios and one reverse speed or torque ratio. Each forward and reverse speed or torque ratio is attained by engagement of a combination of three of the clutches and brakes as will be explained below. FIG. 9 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 200.

To establish forward and reverse speed ratios, three torque transmitting devices are engaged for each gear state. The engaged clutches and brakes are represented by an "X" in each respective row. For example, to establish reverse gear, the first brake 236, the second brake 238 and the third clutch 232 are engaged or activated. The first brake 236 interconnects the second sun gear member 216B of the second planetary gear set 216 and the third ring gear member 218B of the third planetary gear set 218 to ground, stationary member, or transmission housing 240 through the first shaft, quill or interconnecting member 242. The second brake 238 connects the fourth sun gear member 220C of the fourth planetary gear set 220 to ground, stationary member, or transmission housing 240. The third clutch 232 interconnects the first planet carrier member 214B of the first planetary gear set 214 to the output shaft or member 222 and the fourth ring gear member 220B of the fourth planetary gear set 220. Similarly, the eight forward ratios are achieved through different combinations of clutch and brake engagement as shown in FIG. 9.

It will be appreciated that the operation and gear states of the third embodiment of the eight speed automatic transmission 200 assume, first of all, that the brakes and clutches not specifically referenced in a given gear state are inactive or disengaged and, second of all, that during gear member shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
an input member;
an output member;
first, second, third and fourth planetary gear sets each having first, second and third members;
a first interconnecting member continuously interconnecting the third member of the first planetary gear set with the second member of the third planetary gear set;
a second interconnecting member continuously interconnecting the first member of the second planetary gear set with the first member of the third planetary gear set;
a third interconnecting member continuously interconnecting the third member of the third planetary gear set with the first member of the fourth planetary gear set; and
five torque transmitting devices each selectively engageable to interconnect one of the first members, second members, and third members with at least one of another of the first members, second members, third members, and a stationary member, and
wherein the torque transmitting devices are selectively engageable in combinations of at least three to establish at least eight forward speed ratios and at least one reverse speed ratio between the input member and the output member.

2. The transmission of claim 1 wherein a first of the five torque transmitting devices is selectively engageable to interconnect at least one of the first member of the second planetary gear set and the first member of the third planetary gear set with the second member of the first planetary gear set.

3. The transmission of claim 2 wherein a second of the five torque transmitting devices is selectively engageable to interconnect the third member of the second planetary gear set with at least one of the second member of the fourth planetary gear set and the output member.

4. The transmission of claim 3 wherein a third of the five torque transmitting devices is selectively engageable to interconnect at least one of the first member of the third planetary gear set and the first member of the second planetary gear set with at least one of the third member of the third planetary gear set and the first member of the fourth planetary gear set.

5. The transmission of claim 4 wherein a fourth of the five torque transmitting devices is selectively engageable to interconnect the second member of the first planetary gear with the stationary member.

6. The transmission of claim 5 wherein a fifth of the five torque transmitting devices is selectively engageable to interconnect the third member of the fourth planetary gear set with the stationary member.

7. The transmission of claim 1 wherein the first members are sun gears, the second members are carrier members, and the third members are ring gears.

8. The transmission of claim 1 wherein the input member is continuously interconnected with the first member of the first planetary gear set and the second member of the second planetary gear set and the output member is continuously interconnected with the second member of the fourth planetary gear set.

9. The transmission of claim 1 wherein a first of the five torque transmitting devices is selectively engageable to interconnect the second member of the first planetary gear set with the third member of the second planetary gear set.

10. The transmission of claim 9 wherein a second of the five torque transmitting devices is selectively engageable to interconnect at least one of the first member of the second planetary gear set and the first member of the third planetary gear set with the second member of the first planetary gear set.

11. The transmission of claim 10 wherein a third of the five torque transmitting devices is selectively engageable to interconnect at least one of the second member of the fourth planetary gear set and the output member with the third member of the second planetary gear set.

12. The transmission of claim 11 wherein a fourth of the five torque transmitting devices is selectively engageable to interconnect at least one of the third member of the first planetary gear set and the second member of the third planetary gear set with the stationary member.

13. The transmission of claim 12 wherein a fifth of the five torque transmitting devices is selectively engageable to interconnect the third member of the fourth planetary gear set with the stationary member.

14. The transmission of claim 1 wherein the third member of the first planetary gear set, the first member of the second planetary gear set, the first member of the third planetary gear set, and the first member of the fourth planetary gear set are sun gears, the first member of the first planetary gear set, the third member of the second planetary gear set, the second member of the third planetary gear set, and the second member of the fourth planetary gear set are carrier members, and the second member of the first planetary gear set, the second member of the second planetary gear set, the third member of the third planetary gear set, and the third member of the fourth planetary gear set are ring gears.

15. The transmission of claim 1 wherein a first of the five torque transmitting devices is selectively engageable to interconnect the third member of the second planetary gear set with at least one of the second member of the third planetary gear set and the third member of the first planetary gear set.

16. The transmission of claim 15 wherein a second of the five torque transmitting devices is selectively engageable to interconnect the third member of the second planetary gear set with the second member of the first planetary gear set.

17. The transmission of claim 16 wherein a third of the five torque transmitting devices is selectively engageable to interconnect at least one of the second member of the fourth planetary gear set and the output member with the second member of the first planetary gear set.

18. The transmission of claim 17 wherein a fourth of the five torque transmitting devices is selectively engageable to interconnect at least one of the first member of the second planetary gear set and the first member of the third planetary gear set with the stationary member.

19. The transmission of claim 1 wherein the third member of the first planetary gear set, the first member of the second planetary gear set, the second member of the third planetary gear set, and the third member of the fourth planetary gear set are sun gears, the second member of the first planetary gear set, the second member of the second planetary gear set, the third member of the third planetary gear set, and the first member of the fourth planetary gear set are carrier members, and the first member of the first planetary gear set, the third member of the second planetary gear set, the first member of the third planetary gear set, and the second member of the fourth planetary gear set are ring gears.

20. The transmission of claim 19 wherein a fifth of the five torque transmitting devices is selectively engageable to interconnect the third member of the fourth planetary gear set with the stationary member.

21. The transmission of claim 1 wherein the stationary member is a transmission housing.

22. A transmission comprising:
an input member;
an output member;
first, second, third and fourth planetary gear sets each having first, second and third members, wherein the input member is continuously interconnected with the first member of the first planetary gear set and the second member of the second planetary gear set and the output member is continuously interconnected with the second member of the fourth planetary gear set;
a first interconnecting member continuously interconnecting the third member of the first planetary gear set with the second member of the third planetary gear set;
a second interconnecting member continuously interconnecting the first member of the second planetary gear set with the first member of the third planetary gear set;
a third interconnecting member continuously interconnecting the third member of the third planetary gear set with the first member of the fourth planetary gear set;
a first torque transmitting device selectively engageable to interconnect at least one of the first member of the second planetary gear set and the first member of the third planetary gear set with the second member of the first planetary gear set;
a second torque transmitting device selectively engageable to interconnect the third member of the second planetary gear set with at least one of the second member of the fourth planetary gear set and the output member;
a third torque transmitting device selectively engageable to interconnect at least one of the first member of the third planetary gear set and the first member of the second planetary gear set with at least one of the third member of the third planetary gear set and the first member of the fourth planetary gear set;
a fourth torque transmitting device selectively engageable to interconnect the second member of the first planetary gear with a stationary member; and
a fifth torque transmitting device selectively engageable to interconnect the third member of the fourth planetary gear set with the stationary member, and
wherein the torque transmitting devices are selectively engageable in combinations of at least three to establish at least eight forward speed ratios and at least one reverse speed ratio between the input member and the output member.

23. The transmission of claim 22 wherein the first members are sun gears, the second members are carrier members, and the third members are ring gears.

24. A transmission comprising:
an input member;
an output member;
first, second, third and fourth planetary gear sets each having first, second and third members, wherein the input member is continuously interconnected with the first member of the first planetary gear set and the second member of the second planetary gear set and the output member is continuously interconnected with the second member of the fourth planetary gear set;
a first interconnecting member continuously interconnecting the third member of the first planetary gear set with the second member of the third planetary gear set;
a second interconnecting member continuously interconnecting the first member of the second planetary gear set with the first member of the third planetary gear set;
a third interconnecting member continuously interconnecting the third member of the third planetary gear set with the first member of the fourth planetary gear set;
a first torque transmitting device selectively engageable to interconnect the second member of the first planetary gear set with the third member of the second planetary gear set;
a second torque transmitting device selectively engageable to interconnect at least one of the first member of the second planetary gear set and the first member of the third planetary gear set with the second member of the first planetary gear set;
a third torque transmitting device selectively engageable to interconnect at least one of the second member of the fourth planetary gear set and the output member with the third member of the second planetary gear set;
a fourth torque transmitting device selectively engageable to interconnect at least one of the third member of the first planetary gear set and the second member of the third planetary gear set with a stationary member; and
a fifth torque transmitting device selectively engageable to interconnect the third member of the fourth planetary gear set with the stationary member, and
wherein the torque transmitting devices are selectively engageable in combinations of at least three to establish at least eight forward speed ratios and at least one reverse speed ratio between the input member and the output member.

25. The transmission of claim 24 wherein the third member of the first planetary gear set, the first member of the second planetary gear set, the first member of the third planetary gear set, and the first member of the fourth planetary gear set are sun gears, the first member of the first planetary gear set, the third member of the second planetary gear set, the second member of the third planetary gear set, and the second member of the fourth planetary gear set are carrier members, and the second member of the first planetary gear set, the second member of the second planetary gear set, the third member of the third planetary gear set, and the third member of the fourth planetary gear set are ring gears.

26. A transmission comprising:
an input member;
an output member;
first, second, third and fourth planetary gear sets each having first, second and third members, wherein the input member is continuously interconnected with the first member of the first planetary gear set and the second member of the second planetary gear set and the output member is continuously interconnected with the second member of the fourth planetary gear set;

a first interconnecting member continuously interconnecting the third member of the first planetary gear set with the second member of the third planetary gear set;

a second interconnecting member continuously interconnecting the first member of the second planetary gear set with the first member of the third planetary gear set;

a third interconnecting member continuously interconnecting the third member of the third planetary gear set with the first member of the fourth planetary gear set;

a first torque transmitting device selectively engageable to interconnect the third member of the second planetary gear set with at least one of the second member of the third planetary gear set and the third member of the first planetary gear set;

a second torque transmitting device selectively engageable to interconnect the third member of the second planetary gear set with the second member of the first planetary gear set;

a third torque transmitting device selectively engageable to interconnect at least one of the second member of the fourth planetary gear set and the output member with the second member of the first planetary gear set;

a fourth torque transmitting device selectively engageable to interconnect at least one of the first member of the second planetary gear set and the first member of the third planetary gear set with a stationary member; and a fifth torque transmitting device selectively engageable to interconnect the third member of the fourth planetary gear set with the stationary member, and wherein the torque transmitting devices are selectively engageable in combinations of at least three to establish at least eight forward speed ratios and at least one reverse speed ratio between the input member and the output member.

27. The transmission of claim 26 wherein the third member of the first planetary gear set, the first member of the second planetary gear set, the second member of the third planetary gear set, and the third member of the fourth planetary gear set are sun gears, the second member of the first planetary gear set, the second member of the second planetary gear set, the third member of the third planetary gear set, and the first member of the fourth planetary gear set are carrier members, and the first member of the first planetary gear set, the third member of the second planetary gear set, the first member of the third planetary gear set, and the second member of the fourth planetary gear set are ring gears.

28. A transmission comprising:

an input member;

an output member;

first, second, third and fourth planetary gear sets each having a sun gear, a carrier member, and a ring gear, wherein the input member is continuously interconnected with the sun gear of the first planetary gear set and the carrier member of the second planetary gear set and the output member is continuously interconnected with the carrier member of the fourth planetary gear set;

a first interconnecting member continuously interconnecting the ring gear of the first planetary gear set with the carrier member of the third planetary gear set;

a second interconnecting member continuously interconnecting the sun gear of the second planetary gear set with the sun gear of the third planetary gear set;

a third interconnecting member continuously interconnecting the ring gear of the third planetary gear set with the sun gear of the fourth planetary gear set;

a first torque transmitting device selectively engageable to interconnect at least one of the sun gear of the second planetary gear set and the sun gear of the third planetary gear set with the carrier member of the first planetary gear set;

a second torque transmitting device selectively engageable to interconnect the ring gear of the second planetary gear set with at least one of the carrier member of the fourth planetary gear set and the output member;

a third torque transmitting device selectively engageable to interconnect at least one of the sun gear of the third planetary gear set and the sun gear of the second planetary gear set with at least one of the ring gear of the third planetary gear set and the sun gear of the fourth planetary gear set;

a fourth torque transmitting device selectively engageable to interconnect the carrier member of the first planetary gear with a stationary member; and a fifth torque transmitting device selectively engageable to interconnect the ring gear of the fourth planetary gear set with the stationary member, and wherein the torque transmitting devices are selectively engageable in combinations of at least three to establish at least eight forward speed ratios and at least one reverse speed ratio between the input member and the output member.

29. A transmission comprising:

an input member;

an output member;

first, second, third and fourth planetary gear sets each having a sun gear, a carrier member, and a ring gear, wherein the input member is continuously interconnected with the carrier member of the first planetary gear set and the ring gear of the second planetary gear set and the output member is continuously interconnected with the carrier member of the fourth planetary gear set;

a first interconnecting member continuously interconnecting the sun gear of the first planetary gear set with the carrier member of the third planetary gear set;

a second interconnecting member continuously interconnecting the sun gear of the second planetary gear set with the sun gear of the third planetary gear set;

a third interconnecting member continuously interconnecting the ring gear of the third planetary gear set with the sun gear of the fourth planetary gear set;

a first torque transmitting device selectively engageable to interconnect the ring gear of the first planetary gear set with the carrier member of the second planetary gear set;

a second torque transmitting device selectively engageable to interconnect at least one of the sun gear of the second planetary gear set and the sun gear of the third planetary gear set with the ring gear of the first planetary gear set;

a third torque transmitting device selectively engageable to interconnect at least one of the carrier member of the fourth planetary gear set and the output member with the carrier member of the second planetary gear set;

a fourth torque transmitting device selectively engageable to interconnect at least one of the sun gear of the first planetary gear set and the carrier member of the third planetary gear set with a stationary member; and a fifth torque transmitting device selectively engageable to interconnect the ring gear of the fourth planetary gear set with the stationary member, and wherein the torque transmitting devices are selectively engageable in combinations of at least three to establish at least eight forward speed ratios and at least one reverse speed ratio between the input member and the output member.

30. A transmission comprising:

an input member;

an output member;

first, second, third and fourth planetary gear sets each having a sun gear, a carrier member, and a ring gear, wherein the input member is continuously interconnected with the ring gear of the first planetary gear set and the carrier member of the second planetary gear set and the output member is continuously interconnected with the ring gear of the fourth planetary gear set;

a first interconnecting member continuously interconnecting the sun gear of the first planetary gear set with the sun gear of the third planetary gear set;

a second interconnecting member continuously interconnecting the sun gear of the second planetary gear set with the ring gear of the third planetary gear set;

a third interconnecting member continuously interconnecting the carrier member of the third planetary gear set with the carrier member of the fourth planetary gear set;

a first torque transmitting device selectively engageable to interconnect the ring gear of the second planetary gear set with at least one of the sun gear of the third planetary gear set and the sun gear of the first planetary gear set;

a second torque transmitting device selectively engageable to interconnect the ring gear of the second planetary gear set with the carrier member of the first planetary gear set;

a third torque transmitting device selectively engageable to interconnect at least one of the ring gear of the fourth planetary gear set and the output member with the carrier member of the first planetary gear set;

a fourth torque transmitting device selectively engageable to interconnect at least one of the sun gear of the second planetary gear set and the ring gear of the third planetary gear set with a stationary member; and a fifth torque transmitting device selectively engageable to interconnect the sun gear of the fourth planetary gear set with the stationary member, and wherein the torque transmitting devices are selectively engageable in combinations of at least three to establish at least eight forward speed ratios and at least one reverse speed ratio between the input member and the output member.

* * * * *